(12) United States Patent
Shattuck

(10) Patent No.: US 10,909,878 B2
(45) Date of Patent: Feb. 2, 2021

(54) METHOD AND SYSTEM FOR PROVIDING KINESTHETIC AWARENESS

(71) Applicant: Jo Shattuck, Evergreen, CO (US)

(72) Inventor: Jo Shattuck, Evergreen, CO (US)

(73) Assignee: PNTC Holdings LLC, Evergreen, CO (US)

( * ) Notice: Subject to any disclaimer, the term of this patent is extended or adjusted under 35 U.S.C. 154(b) by 350 days.

(21) Appl. No.: 16/044,506

(22) Filed: Jul. 24, 2018

(65) Prior Publication Data

US 2019/0027058 A1 Jan. 24, 2019

Related U.S. Application Data

(60) Provisional application No. 62/536,303, filed on Jul. 24, 2017.

(51) Int. Cl.
*G09B 19/00* (2006.01)
*G09B 5/06* (2006.01)
*A63B 24/00* (2006.01)

(52) U.S. Cl.
CPC ........ *G09B 19/003* (2013.01); *A63B 24/0062* (2013.01); *G09B 5/06* (2013.01); *A63B 2220/40* (2013.01); *A63B 2220/802* (2013.01); *A63B 2220/803* (2013.01); *A63B 2220/836* (2013.01)

(58) Field of Classification Search
CPC ........ G09B 19/00; G09B 19/003; G09B 5/06; A63B 24/00; A63B 24/0062; A63B 220/40; A63B 220/802; A63B 220/803; A63B 220/836
See application file for complete search history.

(56) References Cited

U.S. PATENT DOCUMENTS

| | | | |
|---|---|---|---|
| 2015/0079565 A1* | 3/2015 | Miller | G16H 20/40 434/252 |
| 2016/0049089 A1* | 2/2016 | Witt | G06K 9/00342 434/258 |
| 2016/0199693 A1* | 7/2016 | Vermilyea | A63B 69/3608 700/91 |
| 2018/0161623 A1* | 6/2018 | Nejezchleb | G06K 9/00342 |

* cited by examiner

*Primary Examiner* — Timothy A Musselman
(74) *Attorney, Agent, or Firm* — Suiter Swantz pc llo

(57) ABSTRACT

A method and system for monitoring physiological movements and providing feedback to increase a user's kinesthetic awareness utilizes a kinesthetic awareness tool that includes a plurality of sensors, a processing unit, and a plurality of feedback devices. The plurality of sensors is used to gather data as a set of reference data and in real-time as a user engages in a training session. The plurality of sensors may include an accelerometer, gyroscope, magnetometer, and ultrasonic range finder. Data obtained during the training session is processed in real-time by the processing unit and compared to the set of reference data. The processing device may then instruct one or more of the plurality of feedback devices to produce a response signal to guide the user to the correct position. The plurality of feedback devices may be configured to provide acoustic, visual, haptic, or kinetic feedback.

13 Claims, 8 Drawing Sheets

METHOD AND SYSTEM FOR PROVIDING KINESTHETIC AWARENESS

The current application claims a priority to the U.S. Provisional Patent application Ser. No. 62/536,303 filed on Jul. 24, 2017.

FIELD OF THE INVENTION

The present invention relates generally to motion capture, correction and feedback tools in human kinetics and kinematics. More specifically, the present invention provides a method and system for monitoring and recording body or tool movements, bio and neuro physiological, and providing various forms of feedback to increase a user's kinesthetic awareness.

BACKGROUND OF THE INVENTION

The kinesthetic awareness tool (KAT) is a system of instruments designed to combine sensing, monitoring, and recording of inertial measurement units (of distances, positions, angles, velocity) and of bio physiological and neurophysiological data (for example, including but not limited to heart rate, brain waves, muscle activity) from several wearable/handheld devices, and to provide various delivery methods of feedback (e.g., audio, visual, texture, tactile and haptic) in multiple methods (dose, duration, frequency, intensity and type) in response to the values (e.g., aggregated values or individual values) of those measurements. The feedback can be offered concurrently during real-time movement, intermittently (at various fixed or random intervals during real-time movement), or at a later time, (in post movement review) with individually customized (pre-determined by an expert) target parameters of proper movements and position for a particular task or movement or position, or without (general knowledge of basic movements (for example, walking) and that can be applied to large populations).

The present invention relates generally to a system that includes one or more wearable devices that record and monitor the positions and movements of said devices while being used in human movement. For the purposes of this application, movement and skill are used interchangeably to identify any desired action, pose, and/or exercise. The system has applications in motor skill acquisition, physical therapy, fitness, rehabilitation and motor learning for sports skills and/or the arts. More specifically, the present invention is a platform of devices containing multiple sensors (e.g., accelerometer, gyroscope, inertial measurement unit (IMU) sensors, magnetometer, and sonar sensors) which capture and record the movements and positions of a body part or object and provides visual, audio, tactile and haptic feedback to the user regarding their movements/positions/angles and bio physiological measures of their body and/or the movements/position/angles of the tool or object they are currently using. Target parameters can be determined by the user, or coach and represent the desired movement or positions. The feedback provided to the user during practice is based on an algorithm that analyzes the actual IMU data with the desired IMU, and additional multiple factors including: skill level of the user, component of practice, previous practice, user's sleep quality and duration, along with the IMU and biological and neurological input signals of the multiple sensors.

The KAT system's operations algorithms are based on multiple scientific principles known to be important factors in improve human movement performance. These elements include but are not limited to: accurate proprioception, degrees of freedom, variable feedback, practice, movement variability and motor control strategies. All are described in the context of the dynamical systems theory of motor learning.

Proprioception: In human movement, proper proprioception (knowledge of one/s only body in time and space) is essential to motor learning.

Degrees of Freedom: There are multiple ways the body, (with its various muscles and joints), performs a movement. In motor learning and human biomechanics, this is known as the degrees-of-freedom movement problem. This problem is partially resolved in the class of the dynamical systems theories. Dynamical Systems Perspective: The dynamical systems perspective (DSP) suggests that all human movement involves dynamic self-organization of multiple body systems (for example, the proprioception, vestibular, visual motor, neuromuscular systems and others), working together to solve a degrees-of-freedom movement problem. The attempts to solve the problem contain inherently varying patterns, even when the individual actively intends to repeat the same movement. These inherently varying patterns (called movement variability) were once thought to be detrimental to optimal performance, but now are being embraced by biomechanical experts to play an important role in adaptability, flexibility and subsequent increased performance under stressful conditions.

Motor control strategies: Small muscular adjustments (conscious or unconscious) that occur during a movement are thought to counter this inherent movement variability. Improving motor control within a small range of movement variability systems appears to create the 'best', most flexible and adaptable movements during performance.

Feedback: While any body movement includes feedback through the body's somatosensory afferent pathways, (part the system that allows you to feel the weight of an object or know where how your hand is positioned); additional information can be provided to the performer. Motor learning principles of feedback during practice involve internal (on a body part), external (on an object outside the body-a wall, floor, or net), augmented (in addition to natural somatic sensations), descriptive (what was done) and prescriptive (what 'should' be done) types of feedback. They type and timing of the delivery of the feedback, (frequency, duration, intensity) and content (qualitative or quantitative) can affect the effectiveness of practice as well. For example, a vibratory pattern of subthreshold stochastic resonance, has shown to improve speed of a hopping task. These principles apply to both continuous skills (rhythmic—as in walking or running) and discreet skills (the act of throwing, or sitting), and to both open skills and closed skills. Open skills are dependent on the environment and task constraints, and closed skills are pre-determined, (not dependent on the environment and task constraints). While any body movement includes feedback through the somatosensory afferent pathways, (the system that allows you to feel the weight of an object, or know where how your hand is positioned), additional helpful information can be provided to the performer with the KAT system.

One novel method of delivering this additional information is Kinetic Feedback method. This feature produces pulses, or small internal movements in 3 possible axis, and multiple speeds (felt as gentle "pulls or pushes" in specific directions) to guide the user with prescriptive concurrent feedback as the movement is being executed.

Practice: There are several pedagogical approaches to practice. On one end of the spectrum of skill break-down is the 'progression of skills'. The whole movement is separated into smaller components, and each component slowly added to the whole movement as each skill is mastered. On the other end is 'entirety'. The whole movement is practiced in a single attempt. Practice can be massed (multiple repetition of the same movement) or random (different movements are practiced in random order), and/or various combinations of each. The effectiveness of these practice types has been shown to be skill, context and task dependent.

Sleep: Long Term Potentiation (LTP) or slow-learning is a type of neural re-organization involving the growth new receptors in postsynaptic cells in the C1 and C3 regions of the hippocampus. Greater sleep quality and duration has been shown to have a linear correlation with increased LTP (learning and retention of skills). The KAT's algorithms account for this sleep factor, in addition to the past performance history in each practice using the sleep history input option in the user interface.

The KAT operates under principles of human biomechanics and neuroscience, taking advantage of the elements known to promote successful acquisition, re-acquisition, retention and transfer of both fine (small muscle) and gross (large muscle) movements. The KAT implements these principles based on empirical research into the algorithms used to interpret the sensor inputs, analyze the movements, account for movement variability, and create feedback and practice schedules suited for the skill of the user and temporal variations in motor learning stage, with the end goal of motor skills long term retention and accuracy in improvement of motor skills.

DETAIL DESCRIPTIONS OF THE INVENTION

Figure 1:
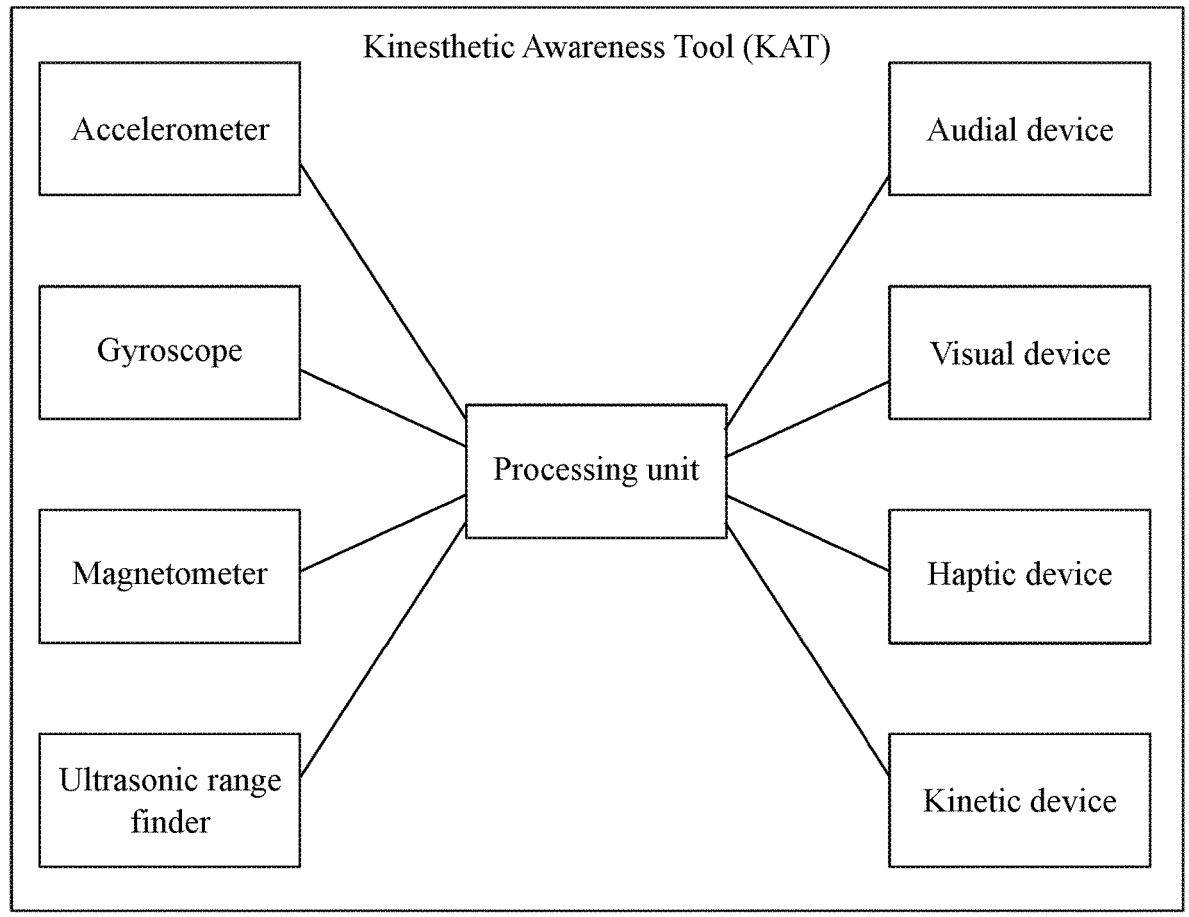
FIG. 1 is a diagram depicting the kinesthetic awareness tool according to one embodiment of the present invention.

All illustrations of the drawings are for the purpose of describing selected versions of the present invention and are not intended to limit the scope of the present invention.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mate-able and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

The present invention can be used for short-term improvements to correct or improve specific movement and/or positions as the user is practicing; the present invention can also be used for long-term use in applications (i.e. when a movement is retarded by movement disorder, disease or other physical limitations). In general terms, the present invention helps the user recalibrate the proprioceptors, and/or mechanoreceptors which are units of cells in the muscle that send information back to the brain about the position, movement, and/or muscle tension of the limbs in time and space.

In physical therapy exercises, using correct movements and achieving the range of motion is critical for optimal recovery. The pre-surgery range of motion is usually re-achieved by gradually increasing the target range of motion (ROM) as the tissue heals, during post-surgery exercises. After knee surgery, walking squats are a common exercise. The present invention can be used to help patients perform these exercises correctly. When attached to the knee, the sensor can be set to a specific distance that reflects the desired degree of angle of the knee, by aiming the sensor at the floor or other part of the body. The present invention will provide feedback to the patient to let them know if his leg angle is within the desired range.

The present invention provides a method and system for monitoring physiological movements and providing feedback to increase a user's kinesthetic awareness. Further, the present invention aims to improve proprioception/motor control by creating new neural pathways. The system includes a kinesthetic awareness tool (KAT) that is designed to combine sensing and recording of positional and bio-physiological measurements and provide various types of feedback in response to the values of those measurements. As such, the KAT comprises a plurality of sensors, a processing unit, and a plurality of feedback devices, as depicted in FIG. 1.

The plurality of sensors is used to measure the position of the KAT in three-dimensional space, and in turn sense if the correct body positions/movements/muscle activations are being achieved. Data from the plurality of sensors is fed to the processing unit, wherein the processing unit generates a feedback response corresponding to the obtained data. To create the feedback response, the data may be weighted according to parameters input by the user, thus the feedback response is unique to that user and/or training session. The feedback response is then compared to adjustable thresholds to determine whether or not a feedback signal is required. If the feedback response falls within a defined feedback range, then the feedback signal is sent, wherein one or more of the plurality of feedback devices produces a signal that is perceptible to the user.

In some embodiments, the KAT may be a wearable device that is attached to the user. In other embodiments, the KAT may be a holdable device. In yet other embodiments, the KAT may be attached to or a tool or object that is used or held by the user. The KAT ensures that the movement made by the user is the desired movement, in the desired direction, within the desired range of motion, and/or the pose held is the desired pose. The system provides visual, audio, tactile and haptic feedback to the user regarding the user's movements/position, and/or the movement/position of the KAT in three axes (up/down, front/back, side/side). The user sees, feels and/or hears the feedback indicating the user's error (range to big, range too small, etc.), so the user can make the necessary adjustments.

The desired movements and/or positions (targets) are set by the primary user or another user (coach, clinician, therapist or other expert) who has knowledge about the desired movement and/or positions. Targets can be set (captured) and adjusted in two ways: in "Easy mode captures", wherein data is captured during live real-time movement; or manually through the KAT or an associated smartphone application. The dimension parameters of each of the plurality of sensors can be individually adjusted, and each of the plurality of sensors can be set to be weighted with more or less 'importance' in the algorithm used to analyze the user's position/movement. This feature becomes beneficial in rehabilitation settings. For example, the speed of the movement of the KAT can be set to have little or less importance, where speed of the movement is not a concern; perhaps in teaching and monitoring a reach and grasp task. In other situations, a height setting (vertical distance) could be set for more importance when teaching/monitoring a range of motion (ROM) task.

In reference to FIG. 1, in some embodiments, the plurality of sensors includes an accelerometer, a magnetometer, a gyroscope, and an ultrasonic range finder. The accelerometer, the magnetometer, the gyroscope, and the ultrasonic range finder are used to collect 9 parameters used to calculate the user's position/movement. Three-dimensional orientation of the KAT (e.g. the angle of the x, y, and z axis of the KAT) is measured by the magnetometer and the gyroscope. Meanwhile, acceleration of the KAT in the x, y, and z directions is measured by the accelerometer. The ultrasonic range finder further measures reference distances along the x, y, and z directions. It may be desirable to collect additional user or environment data in some situations, such as temperature, humidity, pulse, etc. As such, in other embodiments, the plurality of sensors may further include galvanic skin response sensors, a temperature sensor, a barometer sensor, an angle potentiometer, or neuro-, bio-, or electrophysiology sensors.

Each of the plurality of sensors is electronically coupled to the processing unit, wherein the processing unit receives inputs from each of the plurality of sensors and generates a corresponding response. The processing unit may include one or more processors and one or more memory devices (volatile, non-volatile, or a combination thereof). In some embodiments, the processing unit may be programmed to allow for simple upgrades/changes to the KAT. The processing unit allows for the simultaneous collection of data from the plurality of sensors, wherein the sampling rate of each of the plurality of sensors may be adjusted independently by the processing unit.

Each of the plurality of sensors can be grouped into two categories: fixed sampling rate sensors and variable sampling rate sensors. The fixed sampling rate sensors can be configured to provide samples at 1 Hz to 100 Hz (depending on the maximum sensor ability). Meanwhile, the variable sampling rate sensors provide data whenever data is available. The presence of multiple sensors with different sampling rates requires a sample alignment mechanism, wherein the processing unit aligns the data according to the highest-frequency sensor. In other words, if only two sensors are used: one with a 100 Hz sampling rate and another with a 10 Hz sampling rate, the data will be represented using the 100 Hz sampling rate. Two alignment interpolation strategies are available for the user: "hold" and linear interpolation. In "hold" mode, the slower sample is copied until the new sample arrives. In linear interpolation mode, the "missing" intermediate samples of the slower sensor are interpolated linearly.

In some embodiments, an external monitoring device may be used in conjunction with the KAT in order to gather additional data. The external monitoring device may include one or more additional sensors that is used in addition to the plurality of sensors to develop the feedback response. The external monitoring device may be wirelessly coupled to the KAT or connected to the KAT via a wired connection. Data collected by the one or more additional sensors is sent to the processing unit, wherein the data from the one or more additional sensors is combined with the data from the plurality of sensors. Similar to the plurality of sensors, each of the one or more additional sensors can be grouped into two categories: fixed sampling rate sensors and variable sampling rate sensors.

In some embodiments, the external monitoring device is used to measure the angle between two joints on a human body, wherein the external monitoring device includes a potentiometer, a sensor plate, and a remote extensible reference rod. The potentiometer is mounted to the sensor plate, while the remote extensible reference rod is connected to the potentiometer such that the potentiometer forms a pivot point between the sensor plate and the remote extensible reference rod. Preferably, the potentiometer is a rotary potentiometer; however, it may be possible to use a linear potentiometer in some embodiments. A high precision analogue to digital converter (ADC) may be dedicated to reading the analog values of the potentiometer and converting the analog values to digital values that can be interpreted by the processing unit.

In other embodiments, the external monitoring device is used to measure electrocardiography (EKG) or electromyography (EMG) inputs, wherein the external monitoring device comprises a plurality of electrodes. Each of the plurality of electrodes is placed onto the user's body in the desired location. Preferably, the plurality of electrodes includes three electrodes: a first electrode (A), a second electrode (B), and a third electrode (REF). The first electrode and the second electrode are placed around the muscle which activity is being measured, while the third electrode is placed on the bone. A high quality, low-noise differential amplifier may be used to amplify or rectify the signals received from the plurality of electrodes, such that the signals are readable by the ADC.

Upon processing data acquired from the plurality of sensors, and optionally data from the external monitoring device, the processing unit may enable one or more of the plurality of feedback devices to produce a signal that is perceptible to the user. The plurality of feedback devices may provide acoustic feedback, visual feedback, haptic feedback, kinetic feedback, or a combination thereof. As such, the plurality of feedback devices may include at least one of an audial device, a visual device, a haptic device, and a kinetic device, as depicted in FIG. 1. The audial device may be a speaker, beeper, or similar device capable of emitting an audible noise. The visual device may be one or more lights, a display screen, or other similar device capable of generating a visual cue. The haptic device may be a vibrating motor, a linear actuator, or a similar device capable of producing a physical sensation that can be sensed by the user. The kinetic device may be a torque motor or another device capable of imparting a direct force on the user or imparting a perceived force on the user, enabling the user to "feel" where the desired position is located.

The KAT includes a housing within which the plurality of sensors, the processing unit, and the plurality of feedback devices are mounted. The housing may be configured with an attachment mechanism, allowing the KAT to be readily attached to the user. The attachment mechanism may include the use of hook and loop fasteners, straps, or an adhesive in some embodiments. In other embodiments, the housing may be configured to be fit and contained within a specialized pocket on the user's clothing. In some embodiments, the KAT may further include a transceiver, wherein the transceiver allows the processing unit to wirelessly connect to the external monitoring device. The transceiver is mounted within the housing and electronically connected to the processing unit.

The KAT may further include a battery, wherein the battery supplies current to the plurality of sensors, the processing unit, the plurality of feedback devices, and any other electronic components of the KAT. The battery may be non-rechargeable or rechargeable. In some embodiments, the KAT may use a wired connection to draw current from a power source. The KAT may further comprise one or more ports that are integrated into the housing, electronically connected to the processing unit, and electrically connected to the battery. The one or more ports can be provided for performing a number of functions, including but not limited to charging the battery, connecting the external monitoring device, or connecting an external storage device such as a secure digital (SD) card or universal serial bus (USB) drive.

In some embodiments, the KAT may comprise a plurality of controls. The plurality of controls is integrated into the housing and may include one or more buttons, knobs, a touchscreen, or any other suitable means of receiving user input. Basic, intuitive user interaction is ensured by ergonomic placement of the plurality of controls about the housing. The plurality of controls allows the user to adjust parameters of the plurality of sensors and the plurality of feedback devices and initiate sequences performed by the processing unit. Controlled parameters and sequences may be visible on a display screen of the KAT. In some embodiments, the KAT may include a microphone, wherein the microphone is electronically connected to the processing unit. The microphone may be used to receive voice commands for controlling parameters of the plurality of sensors and the plurality of feedback devices and initiate sequences performed by the processing unit. Alternatively, the microphone may be used to sample additional user data, such as the breathing rate of the user.

Figure 2:
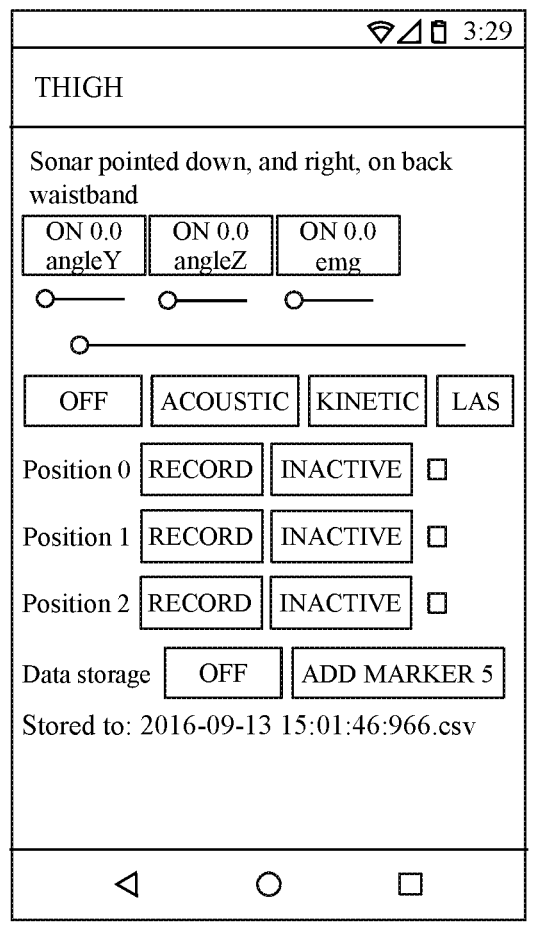
FIG. 2 is a diagram depicting an exemplary embodiment of the user interface of the software application.

In reference to FIG. 2, the present invention may further include a software application that can be operated on an external computing device such as a smartphone, personal computer, or server. The KAT can wirelessly connect to the external computing device either directly or indirectly through a network. The software application provides a user interface that allows the user to monitor and adjust parameters and thresholds of the plurality of sensors and the plurality of feedback devices and initiate sequences performed by the processing unit. Furthermore, the software application may be used to monitor one or more subsequent KATs, wherein the software application provides a "tabs"-styled interface for managing multiple connections and selecting the desired KAT.

The KAT has three modes of operation: Capture, Reference and Run. In reference to FIG. 3, in the Capture mode the KAT collects, using the plurality of sensors, a set of reference data which is used in the Run mode to calculate a numerical response. The set of reference data is stored in memory, wherein the user can modify the set of reference data in the Reference mode. The KAT organizes the set of reference data into one or more positions defined as allowable ranges (minimum and maximum) of values of the parameters of the plurality of sensors.

To begin a training session, the user first positions the KAT about the desired body part to monitor. Once secured to the user, the Capture mode can be initiated, either through the plurality of controls or the software application. The goal of the Capture mode is to allow the user to automatically capture the set of reference data which will be used to define the one or more positions. To collect the set of reference data, the user starts a Capture Session. The Capture Session can be either static or dynamic.

A Static Capture Session consists of recording the one or more positions with a configurable transition interval between each of the positions, wherein the number of the one or more positions is defined by the user. The transition interval may be three seconds by default; however, the user can adjust the value of the transition interval through the plurality of controls or the software application. Each of the positions is maintained for a recording duration, wherein the plurality of sensors continuously collect data. The recording duration for each of the positions is set to five seconds by default but can be configured through the plurality of controls or the software application as well. The KAT is supposed to be held still at each of the positions while collecting the set of reference data but has to be moved to the subsequent position within the transition interval.

As more than one position can be recorded during the Static Capture Session, the set of reference data may include a data sub-set for each of the positions. The data sub-set for each of the positions is captured for the length of the recording duration and statistics such as minimum and maximum value, median, mean, and standard deviation are calculated. A configurable sampling rate (usually between 10-100 samples per second) can be adjusted by the user and is used to determine the amount of data collected during the recording duration for each of the positions. When recording multiple positions, the user starts at an initial position, wherein the plurality of sensors gathers the data sub-set for the initial position. After recording the data sub-set for the initial position, the user transitions to a subsequent position within the transition interval. The plurality of sensors then gathers the data sub-set for the subsequent position. This process is continued until the data sub-set has been collected for a final position in the sequence. Once the data sub-set for each of the positions has been captured, the set of reference data is stored in memory by the processing unit. The processing unit defines the allowable range of parameters gathered by the plurality of sensors for each of the positions using a median filter and empirically predetermined standard errors and statistics measured during the capture session.

In a Dynamic Capture Session, the user specifies the duration of the overall capture session and the number of positions that should be defined based on the set of reference data captured during the Dynamic Capture Session. The processing unit determines the boundaries of each of the positions automatically and defines the allowable ranges for each of the positions based on the medians and standard deviations of each parameter recorded by the plurality of sensors. In its behavior, Dynamic Capture is similar to the multi-point scenario of Static Capture but instead of holding the KAT still for the length of the recording duration and moving the KAT only during the transition interval, the user moves the KAT freely, performing all movements. The KAT then decides on how to organize and cluster the set of reference data into the data sub-set for each of the positions.

Figure 6:
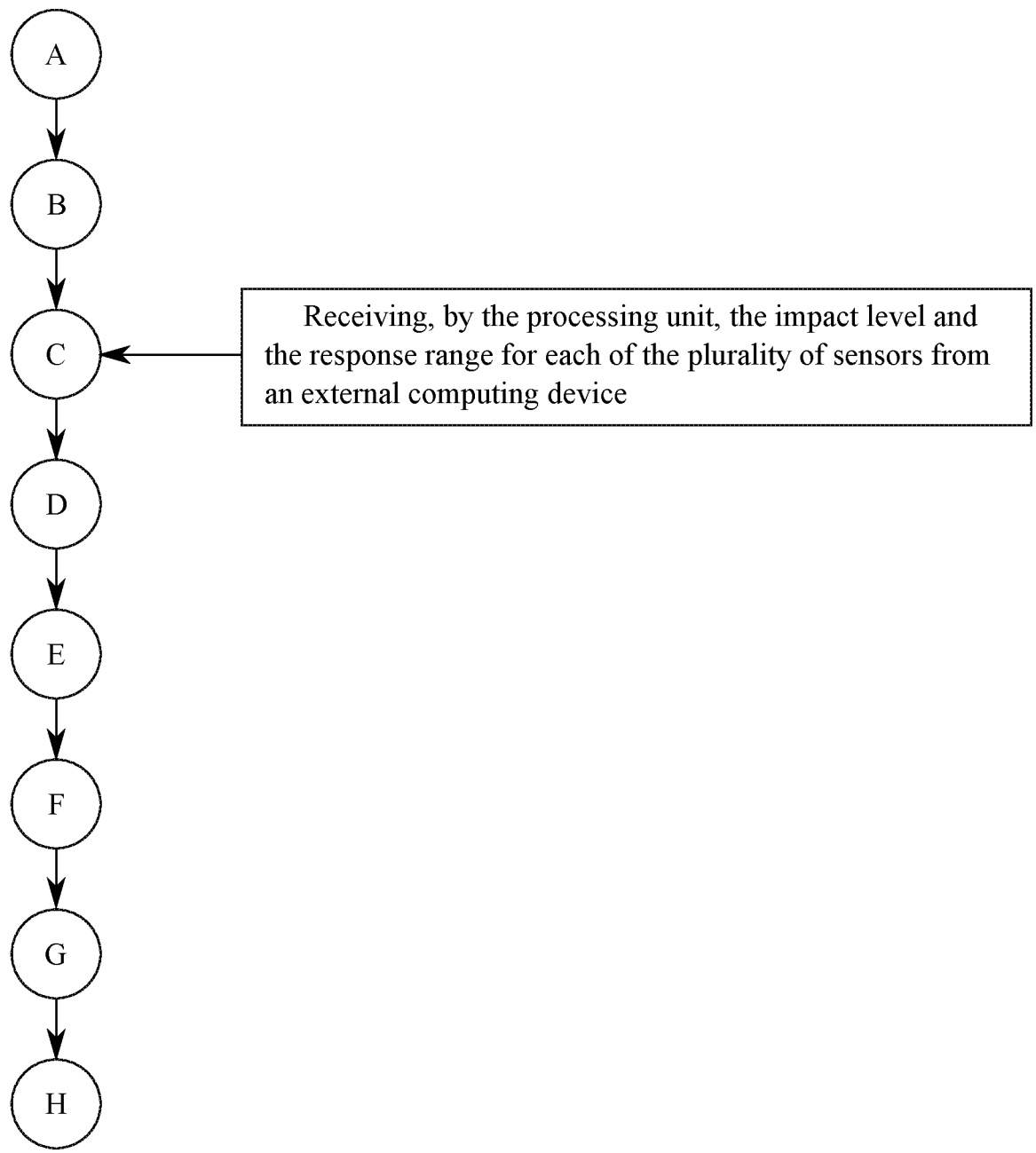
FIG. 6 is a flowchart further depicting the step of receiving input parameters from an external computing device.

Once the set of reference data has been collected, the user can initiate the Reference mode. The Reference mode allows the user to review and edit each of the positions. More specifically, the user can edit an impact level and a response range for each of the plurality of sensors. The user can edit the response range (value boundaries) of each parameter gathered by the plurality of sensors for each of the positions. To edit the response range for a parameter, the user selects the position and the parameter using the plurality of controls or the software application (wherein the processing unit receives the impact level and response range for each of the plurality of sensors from the external computing device, as depicted in FIG. 6). The user also needs to specify if the minimum (the lower bound) or the maximum (the upper bound) of the response range is being changed. In the Reference mode, each of the plurality of sensors is being sampled to provide a current value of each parameter that is monitored. The current value of each parameter can be presented in two ways: to the user through the display screen of the KAT, or through the external computing device. The user changes the bound value of the response range by confirming the currently sampled value through one of the plurality of controls or the software application.

In addition to editing the response range of each of the plurality of sensors, the user may also adjust the impact level of each parameter gathered by the plurality of sensors for each of the positions. The impact level determines if and how each parameter gathered by the plurality of sensors has an effect on the numerical response. The impact level can be set as one of three settings: "no impact", "active impact", and "passive impact". When "no impact" is selected, the selected parameter is not taken into account in calculating the numerical response. When "active impact" is used, the selected parameter impacts the numerical response when currently sampled values for the parameter are within the response range for the selected position (between the minimum value and the maximum value for given the selected parameter at the selected position). When "passive impact" is used, the selected parameter impacts the numerical response when currently sampled values for the parameter are outside of the response range for the selected position (lower than minimum value or higher than the maximum value).

Figure 3:
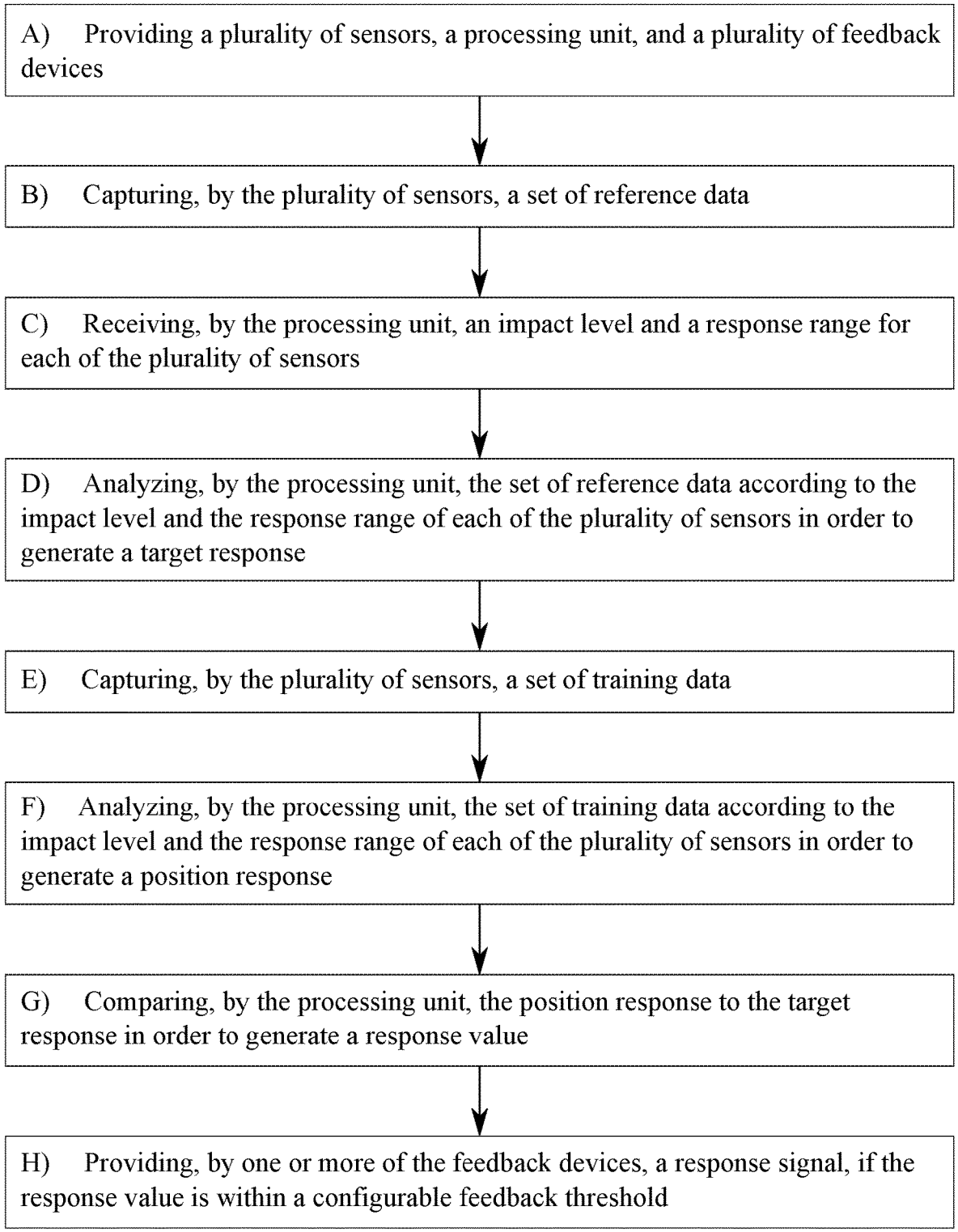
FIG. 3 is a flowchart depicting the steps for monitoring physiological movements and providing feedback to increase a user's kinesthetic awareness.

In reference to FIG. 3, the response range and the impact level for each parameter at each of the positions is stored in memory by the processing unit. The processing unit then analyzes the set of reference data according to the impact level and the response range set for each of the plurality of sensors at each of the positions and generates a target response. The target response may be a singular value or sub-division of numbers, wherein a target value is provided for each parameter of each of the positions. The target response provides the data set to which all subsequent data is compared during the Run mode in order to provide the user with feedback in regards to achieving each of the positions with the desired degree of accuracy.

The Run mode is used to provide the user with real-time feedback by comparing currently sampled data to the target response and actuating one or more of the feedback devices accordingly. In reference to FIG. 3, in the Run mode, the KAT continuously (in real time) captures a training set of data from the plurality of sensors for each repetition through the one or more positions. The KAT then calculates a current response (based on the impact level and response range for each of the plurality of sensors) for the set of training data, which indicates how well the currently sampled data from the plurality of sensors corresponds to the reference data stored for each of the positions. To generate the current response, the processing unit analyzes the set of training data according to the impact level and the response range of each of the plurality of sensors. The current response may be a singular value or sub-division of numbers, wherein a current value is provided for each parameter of each of the positions. The processing unit can then compare the current response to the target response in order to generate the numerical response. If the numerical response is within a configurable feedback threshold, then one or more of the feedback devices provides a response signal to alert the user.

In some embodiments, the numerical response is calculated as the maximum of the current value for each of the positions. The current value for each of the positions is calculated by checking if sampled data is within the response range for any of the parameters set on "active impact" or outside the response range for any of the parameters set on "passive impact". This is done for each of the one or more positions and every parameter. Once calculated, the current value for each of the positions is summed and normalized by the number of parameters of which the impact is different than none to generate a normalized current value for each of the positions. This allows for comparison between each of the positions. After normalization, the maximum value and its index is extracted from the normalized current values and stored as the numerical response to determine which of the one or more positions is the most likely for the KAT to be at and what is the measure of the fit. The numerical response is provided as a numerical value between 0-100%, where 0% means that none of the set of training data corresponds to any of the set of reference data and 100% indicates that the set of training data is within the response range of all "active impact" parameters and outside of the response range of all "passive impact" parameters of at least one of the positions. It corresponds to how "far away" the set of training data is from the set of reference data. This strategy can be described as the "winner takes all" among each of the one or more positions.

The KAT allows for the user to set the configurable feedback threshold. The configurable feedback threshold can be set anywhere between 0-100%. Feedback can be configured to be either active or passive. In active feedback mode, the feedback strength is proportional to the numerical response when the numerical response is above the configurable feedback threshold and approaching (or set) to 0% when below. Active feedback mode is supposed to serve as a positive detector. In passive feedback mode, the feedback strength is approaching (or set to) 100% when the numerical response is below the configurable feedback threshold and approaching 0% (or set to) when the numerical response is above the configurable feedback threshold. The feedback strength is used to modulate the type of selected feedback type (e.g. acoustic, visual, haptic, kinetic).

The response signal from the plurality of feedback devices can be generated in three modes: Binary, Gradual, and Guidance. In Binary mode the strength of the feedback strength is set to either 0% or 100% depending on whether or not the numerical response has crossed the configurable feedback threshold. In the Gradual mode the magnitude of the response signal (such as frequency, volume etc.) is proportional to the calculated strength of the numerical response and tracked/modulated using a process identifier (PID) loop with a non-zero derivative term allowing for rapid response and smooth, natural transitioning. In Guidance mode, PIDs are used to modulate the gyroscopic motors, or other kinetic device, depending on how 'far away' the KAT is from the target position, and offers adjustable types of feedback in any combination of vibration, audio sounds, or visual lights. For example: gradient (gradually changing) vibrating sensations, frequency of tone, louder or softer volume variations, sine wave sounds, square wave sound, and other sounds when the KAT moves further towards or moves further away from the target position. The use of gyroscopes allows the KAT to provide an intuitive "guidance" sensation to the user which enables the user to "feel" where the target position is located.

Figure 4:
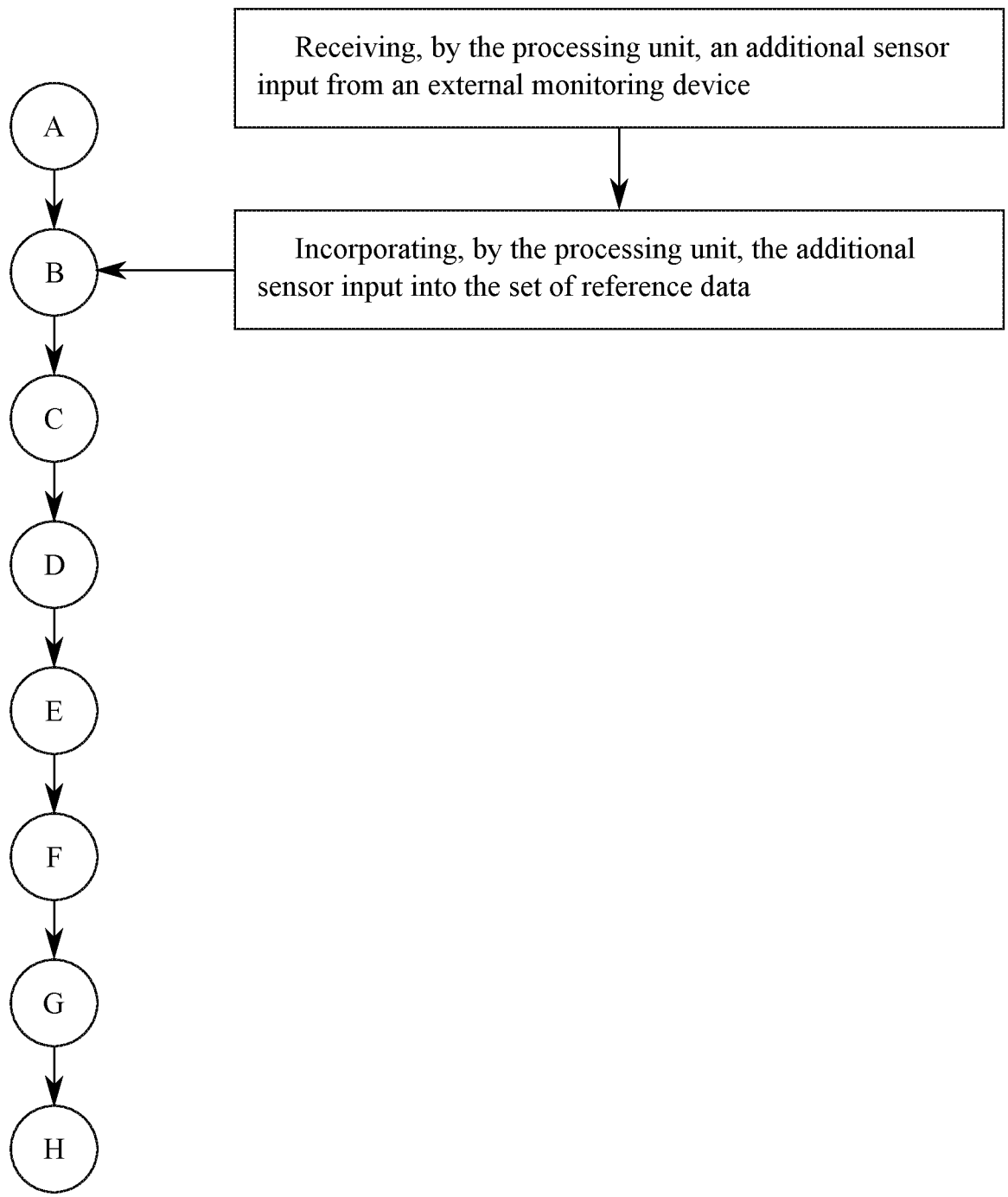
FIG. 4 is a flowchart further depicting steps for utilizing an external monitoring device to gather additional reference data.
Figure 5:
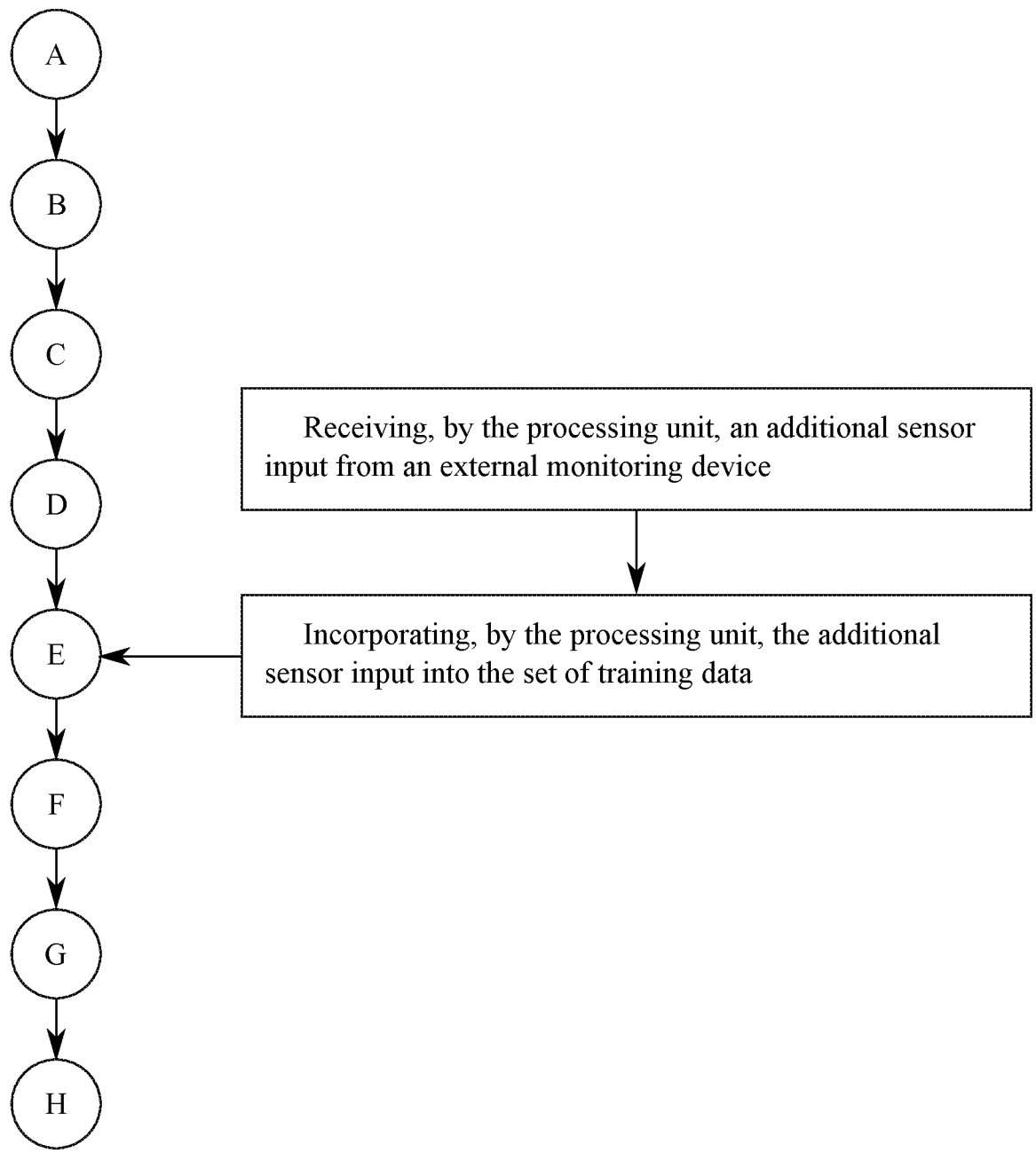
FIG. 5 is a flowchart further depicting steps for utilizing an external monitoring device to gather additional training data during a training session.

In reference to FIG. 4-5, in some embodiments, the external monitoring device is used to obtain additional data, in which case the processing unit receives an additional sensor input from the external monitoring device during both the Capture mode and the Run mode. When implementing the capture mode, the processing unit incorporates the additional sensor input into the set of reference data. As such, the additional sensor input is incorporated in generating the target response. When the Run mode is subsequently implemented, the processing unit incorporates the additional sensor input currently sampled into the set of training data. As such, the additional sensor input currently sampled is incorporated in generating the current response, and in turn the numerical response used for determining the response signal.

Figure 7:
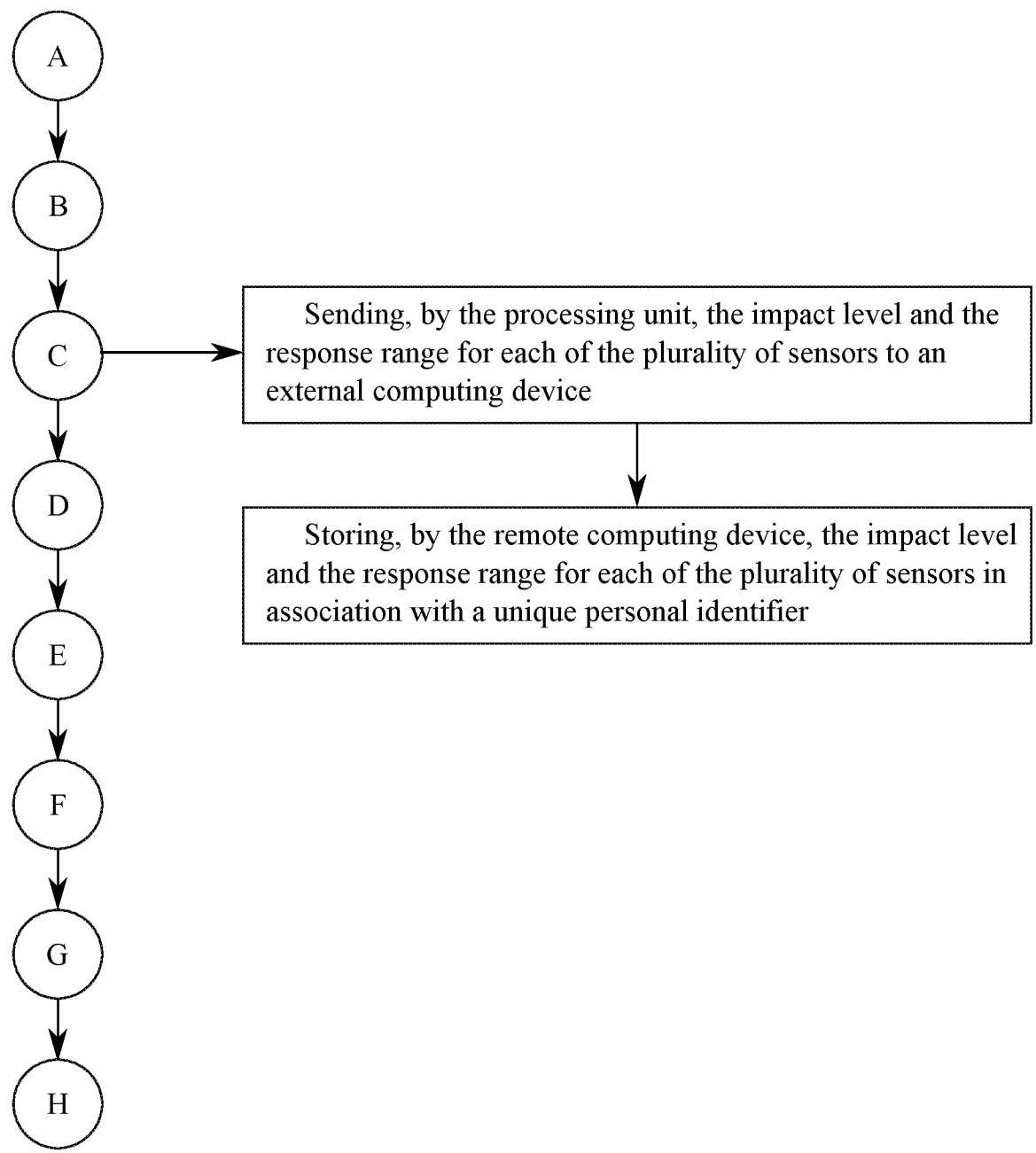
FIG. 7 is a flowchart depicting steps for storing and associating user parameters for a training session with a unique personal identifier for future use.

In reference to FIG. 7, in an effort to save the user time when repeating a training session, the present invention provides a user identification (ID) setting control. The user ID setting control allows the user to store the impact level and the response range for each of the plurality of sensors in association with a unique personal identifier. The processing unit may store the impact level and the response range for each of the plurality of sensors locally or send the impact level and the response range for each of the plurality of sensors to the external computing device. The impact level and the response range for each of the plurality of sensors are stored in association with the unique personal identifier on either the processing unit or the external computing device. The next time the user wishes to perform a training session, the Capture mode and Reference mode sequences can be skipped, wherein the user simply loads the stored data. Furthermore, the use of the user ID setting control allows the KAT to be used with multiple people, as each individual can create a unique profile with which to associate data.

Figure 8:
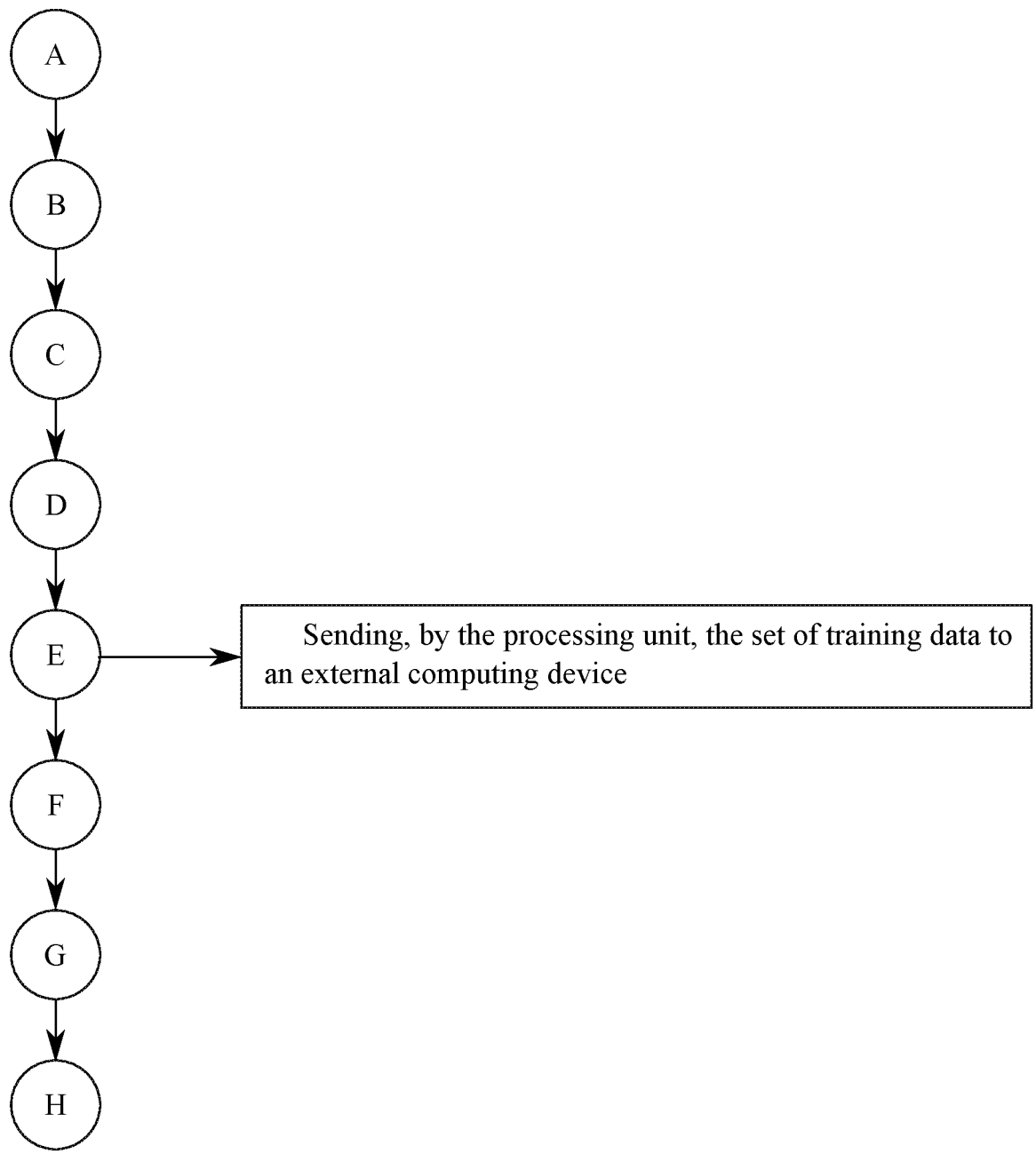
FIG. 8 is a flowchart depicting steps sending training data to an external computing device to be stored and/or used for future training analysis.

In reference to FIG. 8, the present invention may further implement a practice feature, wherein the set of training data for each repetition and the number of correct and/or incorrect repetitions is collected and stored for each practice session. This allows the user to track his or her progress over multiple training sessions. Before each practice session, the user can set performance goals to reach during the current practice session. The present invention will activate feedback to let the user know when the desired number of corrected movements has been completed. The present invention can also be set to count the number of correct repetitions completed within a set time span. The data can be stored for each user in the data storage slot, and/or transmitted via various wireless methods, as mentioned above. The set of training data for each repetition may be stored in association with the unique personal identifier to allow the user to access and track the data. The set of training data for each repetition may be stored locally by the processing device. Alternatively, the processing device may send the set of training data for each repetition to the external computing device, wherein the set of training data for each repetition is stored remotely.

The present invention can also be programmed for sequential movements (Dynamic Capture) used with multiple sensors to track a complex sequence of movement. For example, sensor 1 must determine that a certain parameter is met before sensor 2 detects its own pre-set distance before the feedback is delivered.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although the invention has been explained in relation to its preferred embodiment, it is to be understood that many other possible modifications and variations can be made without departing from the spirit and scope of the invention as hereinafter claimed.

What is claimed is:

1. A method for providing kinesthetic training feedback using a kinesthetic awareness tool, the method comprising the steps of:
   providing a plurality of sensors, a processing unit, and a plurality of feedback devices;
   capturing, by the plurality of sensors, a set of reference data;
   receiving, by the processing unit, an impact level and a response range for each of the plurality of sensors;
   analyzing, by the processing unit, the set of reference data according to the impact level and the response range of each of the plurality of sensors in order to generate a target response;
   capturing, by the plurality of sensors, a set of training data;
   analyzing, by the processing unit, the set of training data according to the impact level and the response range of each of the plurality of sensors in order to generate a position response;
   comparing, by the processing unit, the position response to the target response in order to generate a response value; and
   providing, by one or more of the feedback devices, a response signal, if the response value is within a configurable feedback threshold.

2. The method for providing kinesthetic training feedback using a kinesthetic awareness tool, the method as claimed in claim 1 further comprises the step of:
   receiving, by the processing unit, an additional sensor input from an external monitoring device.

3. The method for providing kinesthetic training feedback using a kinesthetic awareness tool, the method as claimed in claim 2 further comprises the step of:
   incorporating, by the processing unit, the additional sensor input into the set of reference data.

4. The method for providing kinesthetic training feedback using a kinesthetic awareness tool, the method as claimed in claim 2 further comprises the step of:
   incorporating, by the processing unit, the additional sensor input into the set of training data.

5. The method for providing kinesthetic training feedback using a kinesthetic awareness tool, the method as claimed in claim 2, wherein the external monitoring device includes a potentiometer.

6. The method for providing kinesthetic training feedback using a kinesthetic awareness tool, the method as claimed in claim 2, wherein the external monitoring device includes a plurality of electrodes.

7. The method for providing kinesthetic training feedback using a kinesthetic awareness tool, the method as claimed in claim 1, wherein the plurality of sensors includes an accelerometer, a magnetometer, a gyroscope, and an ultrasonic range finder.

8. The method for providing kinesthetic training feedback using a kinesthetic awareness tool, the method as claimed in claim 1, wherein the response signal is binary.

9. The method for providing kinesthetic training feedback using a kinesthetic awareness tool, the method as claimed in claim 1, wherein the response signal is gradated.

10. The method for providing kinesthetic training feedback using a kinesthetic awareness tool, the method as claimed in claim 1, wherein the plurality of feedback devices includes at least one of an audial device, a visual device, a haptic device, and a kinetic device.

11. The method for providing kinesthetic training feedback using a kinesthetic awareness tool, the method as claimed in claim 1 further comprises the step of:
    receiving, by the processing unit, the impact level and the response range for each of the plurality of sensors from an external computing device.

12. The method for providing kinesthetic training feedback using a kinesthetic awareness tool, the method as claimed in claim 1 further comprises the step of:
    sending, by the processing unit, the set of training data to an external computing device.

13. The method for providing kinesthetic training feedback using a kinesthetic awareness tool, the method as claimed in claim 1 further comprises the step of:
    sending, by the processing unit, the impact level and the response range for each of the plurality of sensors to an external computing device; and
    storing, by the external computing device, the impact level and the response range for each of the plurality of sensors in association with a unique personal identifier.

* * * * *